United States Patent [19]

Lipp et al.

[11] Patent Number: 5,802,362

[45] Date of Patent: Sep. 1, 1998

[54] SYSTEM AND METHOD FOR ENABLING ADAPTERS IN A COMPUTER SYSTEM

[75] Inventors: Walter Manfred Lipp, Georgetown; Chris Alan Schwendiman, Round Rock, both of Tex.

[73] Assignee: International Business Machines Corporation, Armonk, N.Y.

[21] Appl. No.: 656,151

[22] Filed: May 31, 1996

[51] Int. Cl.⁶ .................................................. G06F 9/06
[52] U.S. Cl. ........................................ 395/651; 395/685
[58] Field of Search ............................... 395/651, 652, 395/653, 712, 685, 710

[56] References Cited

U.S. PATENT DOCUMENTS

| | | |
|---|---|---|
| 3,975,712 | 8/1976 | Hepworth et al. . |
| 3,979,732 | 9/1976 | Hepworth et al. . |
| 4,075,691 | 2/1978 | Davis et al. . |
| 4,106,091 | 8/1978 | Hepworth et al. . |
| 4,156,798 | 5/1979 | Doelz . |
| 4,845,609 | 7/1989 | Lighthart et al. . |
| 5,222,062 | 6/1993 | Sharma et al. . |
| 5,226,040 | 7/1993 | Noble, III et al. . |
| 5,280,586 | 1/1994 | Kunz et al. . |
| 5,301,275 | 4/1994 | Vanbuskirk et al. . |
| 5,355,489 | 10/1994 | Bealkowski et al. ............ 395/652 |
| 5,369,748 | 11/1994 | McFarland et al. . |
| 5,414,820 | 5/1995 | McFarland et al. . |
| 5,586,324 | 12/1996 | Sato et al. ..................... 395/652 |
| 5,586,327 | 12/1996 | Bealkowski et al. ............ 395/652 |

*Primary Examiner*—Kevin A. Kriess
*Attorney, Agent, or Firm*—Robert M. Carwell

[57] ABSTRACT

New adapter functions for a computer system are moved from existing TTY configuration code to load modules dynamically linked to the TTY configuration code at run time. A load module attribute stored in a vendor-supplied component of a database provides the load module path and name. Third party vendors may then add TTY configuration support by supplying the load module and adding the appropriate attribute(s) to the database, obviating system vendor assistance or source code access. Ease of configuration is enhanced by avoiding displays of TTY device characteristics not supported by currently installed system hardware. An additional type attribute for predefined attributes in the database permits TTY attributes specific to a particular adapter type to be stored under a unique identifier. The additional type attribute and query of a parent device of a TTY for extended attributes for other device types permit third party vendors to add new adapters by generating a load module linked at run time. Attributes specific to a given adapter are thereby easily added to the existing set of default attributes normally associated with a TTY.

8 Claims, 5 Drawing Sheets

SYSTEM AND METHOD FOR ENABLING ADAPTERS IN A COMPUTER SYSTEM

TECHNICAL FIELD

This invention relates to peripheral adapter device support in computer systems and, more particularly, to systems and methods for facilitating ease of installation of such devices supplied by third party vendors.

BACKGROUND OF THE INVENTION

In modern computer systems, it is commonplace for system manufacturers to provide a mechanism whereby the functionality of the base computer system may be easily enhanced and customized. This is done typically by providing an open architecture, associated bus structures and base hardware designed to enable users to add peripheral hardware devices and associated software support to the base system in order to configure it to their needs. Representative examples of such peripheral adapter devices includes asynchronous adapter cards, storage devices, multimedia devices such as video and sound cards, scanners, modems, serial printers and displays and the like.

Due to the widely varying needs of users, it is conventional in the industry for computer system vendors to rely upon third party vendors to satisfy many customers' needs for such adapters and related adapter support. However, this reliance upon third party vendors in itself has given rise to a serious problem for manufacturers and distributors of the base computer systems. Specifically, typically there are aspects of the computer system per se and its related operating systems intimately related to the needs of these various adapters. These aspects are embedded in the computer system and thus a third party vendor may not necessarily have easy access to system source code or the necessary skills and tools to add the required support for the vendor's new hardware.

Accordingly, such third party vendors typically have no choice but to request the system vendor to provide the necessary new adapter support which may entail, for example, modification of existing configuration methods.

Whereas in the past, this added burden on the system manufacturer may not have been so onerous when the selection and variety of such adapters was more limited, in recent times this burden has become almost unworkable. Referring just to the case of asynchronous adapters to illustrate the point, each time another asynchronous adapter is made available from a third party vendor, this in turn typically has required that the system manufacturer address the fact that correlative new adapter-specific functions must be reflected in the computer system. These might include necessitating the system manufacturer to generate minor numbers and build, for each such adapter, unique device-dependent data structures (DDS) to be hereinafter explained in more detail. Alternatively, if the adapter vendor assumed this burden, this necessitated accessing the manufacturer's source code which due to economic and security reasons often was not desirable from the system manufacturer's perspective.

Thus, every time a vendor provides a new asynchronous adapter for example which is to be added to the suite of adapters which a computer system customer may employ, these functions and data structures must be added to the existing configuration methods employed in configuring the computer system.

In addition to the aforementioned requirement that each such new asynchronous adapter necessitates addition of its respective functions to existing configuration methods, yet additional problems are created by the addition of devices attached to these adapters and their required support in the computer system. Specifically, for example, addition of a new asynchronous adapter requires that adapter-specific TTY attributes be added to the system. This, in turn, typically necessitated that all of the TTY attributes in the system be listed during configuration for each TTY device, regardless of whether the attributes apply or not—thereby confusing the user.

As an example of the latter instance of the deficiencies of current systems, it may be assumed, for example, that a computer system might contain for example a 128 port adapter. It is typical for the system to have a device characteristics listing command (such as "LSATTR" in the case of the AIX (TM) operating system distributed by the IBM Corporation) which may be executed for example for a TTY device on the native serial port. When executed, this command typically will list, as attributes of this port, attributes of the entirety of all the attributes of the 128 port adapter including those which are not even supported by the native serial port device driver.

Thus a system was needed which would facilitate a third party vendor easily adding new adapters and their corresponding attributes to a system for user configuration while avoiding the need for substantial assistance or source code access from the system vendor.

SUMMARY OF THE INVENTION

In accordance with the teachings of the invention, functions unique to various adapters to be added to a computer system, such as building of device-dependent structures and generation of minor numbers, are removed from existing TTY configuration code and moved to load modules of the system. These load modules are dynamically linked to the system vendor's TTY configuration code (CFGTTY in the illustrated embodiment) at run time. A loadmodule attribute stored in a vendor-supplied component of an object database manager database (ODM) (PdAt file in the described embodiment) provides the path and name of the load module. This then permits third party vendors to add TTY configuration support by simply supplying the load module corresponding thereto and adding the appropriate attribute (s) to the ODM database. By so doing, necessity for significant system vendor assistance or access to vendor source code is obviated. Moreover, user ease of configuration is enhanced by avoiding displays of TTY device characteristics not supported by currently installed system hardware.

Additionally, in accordance with the invention, the operating system is provided with functions which permit vendor preprocessing and postprocessing capability for functions which do not exist in current asynch adapters initially provided in the system. The option is further included to provide third party vendors flexibility to develop their own TTY configuration functionality by employing an exit provided in the system vendor's TTY configuration (CFGTTY) module.

Also in accordance with the invention, an additional type attribute is defined for predefined attributes stored in the ODM database. In the described embodiment, this type, "E", permits TTY attributes specific to a particular adapter type to be stored under a unique identifier ("uniquetype" in the described embodiment) for the adapter type.

Moreover, support in the computer operating system is provided for routines for modifying device characteristics (LSATTR, GETATTR, PUTATTR, CFGTTY, CHGTTY in the embodiment described) to facilitate the querying of the parent device of a TTY to detect the aforementioned type=E extended attributes. This type=E flag is, in the preferred embodiment, a generic implementation which may be used by other device types.

Accordingly, as a result of the aforementioned provision for an additional type attribute and ability to query a parent device of a TTY for extended attributes for other device types, this permits third party vendors to add new adapters to the system simply by generating a load module which may be linked at run time. Attributes which are specific to a given adapter may thereby be easily added to the existing set of default attributes normally associated with a TTY.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying figures, wherein:

DETAILED DESCRIPTION OF THE PREFERRED EMBODIMENT

Figure 1:
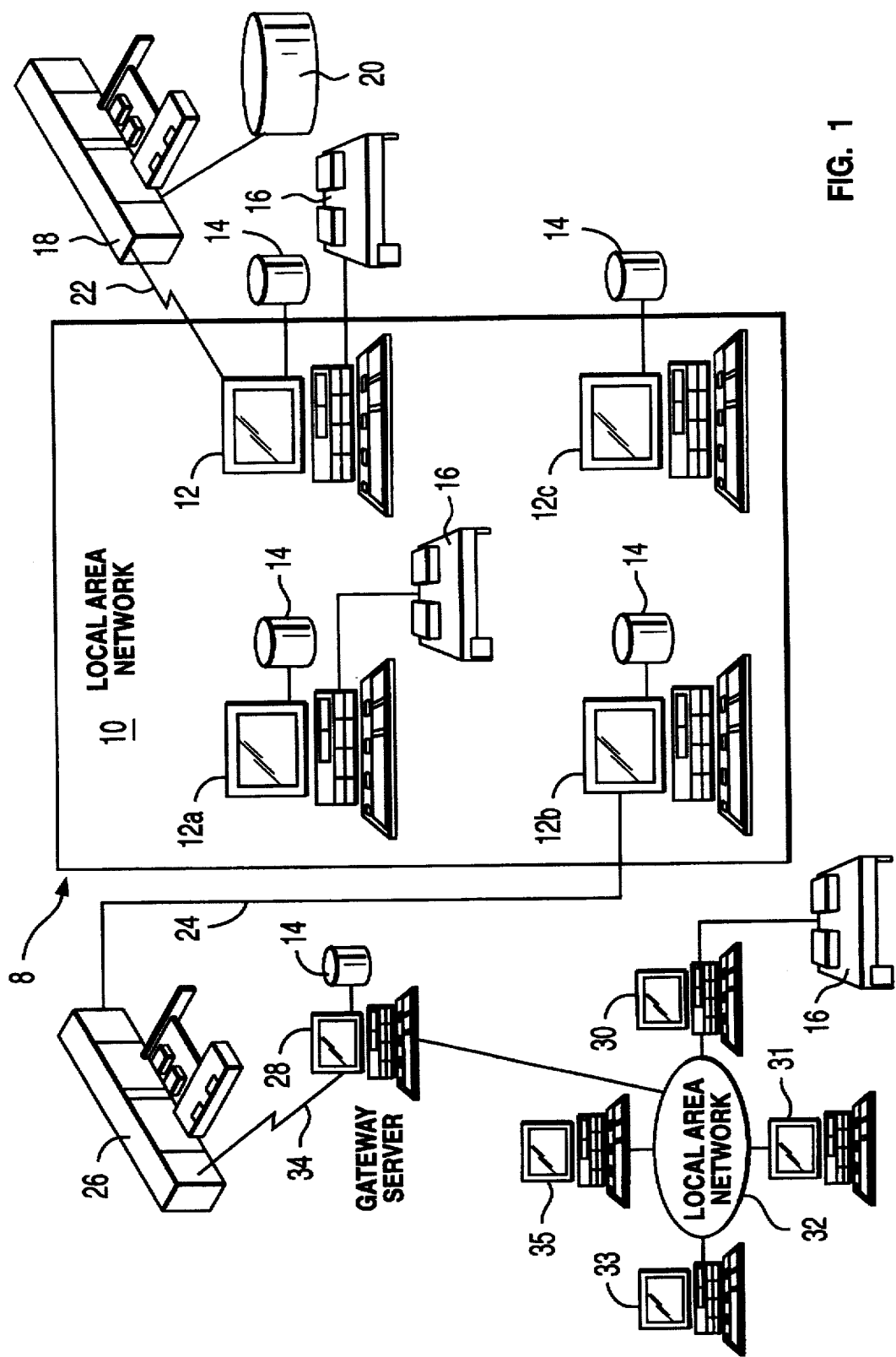
FIG. 1 is a block diagram of a computer network in which the system and method of the invention may be advantageously employed.

With reference now to the figures, and in particular with reference to FIG. 1, there is depicted a pictorial representation of a data processing system 8 which may be utilized to implement the method and system of the present invention. As may be seen, data processing system 8 may include one or more networks, such as local area networks (LAN) 10 and 32, each of which preferably includes a plurality of individual computers 12, 12a–12c, 30, 31, 33 and 35. (Hereafter, when discussing a computer in network 32, a computer 30 will be arbitrarily referenced, although the discussion could relate to any of the computers in network 32). Computers 12 and 30 may be implemented utilizing any suitable computer such as the IBM Personal System/2 (also called a "PS/2") computer or an IBM RISC SYSTEM/6000 computer, both products of International Business Machines corporation, located in Armonk, N.Y. ("RISC SYSTEM/6000" is a trademark of International Business Machines Corporation, "Personal System/2" and "PS/2" are registered trademarks of International Business Machines Corporation). Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store objects, such as documents, resource objects, or executable code, which may be periodically accessed by any user within data processing system 8. In a manner well known in the prior art, each such object stored within a storage device 14 may be freely interchanged throughout data processing system 8 by transferring an object to a user at an individual computer 12 or 30, for example.

Still referring to FIG. 1, it may be seen that data processing system 8 also may include multiple mainframe computers, such as mainframe computer 18, which may be preferably coupled to LAN 10 by means of communications link 22. Mainframe computer 18 may be implemented utilizing an Enterprise Systems Architecture/370 (also called an "ESA/370") or an Enterprise Systems Architecture/390 (also called an "ESA/390") computer available from IBM. Depending on the application a mid-range computer, such as an Application System/400 (also called an "AS/400"), may be employed. "Enterprise Systems Architecture/370", "ESA/370", "Enterprise Systems Architecture/370", and "ESA/390" are trademarks of IBM; "Application System/400" and "AS/400" are registered trademarks of IBM; "Application System/400" and "AS/400" are registered trademarks of IBM. Mainframe computer 18 also may be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

As discussed above with respect to LAN 32 and LAN 10, objects may be stored within storage device 20 and controlled by mainframe computer 18, as Resource Manager or File System Manager for the stored objects. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

Figure 2:
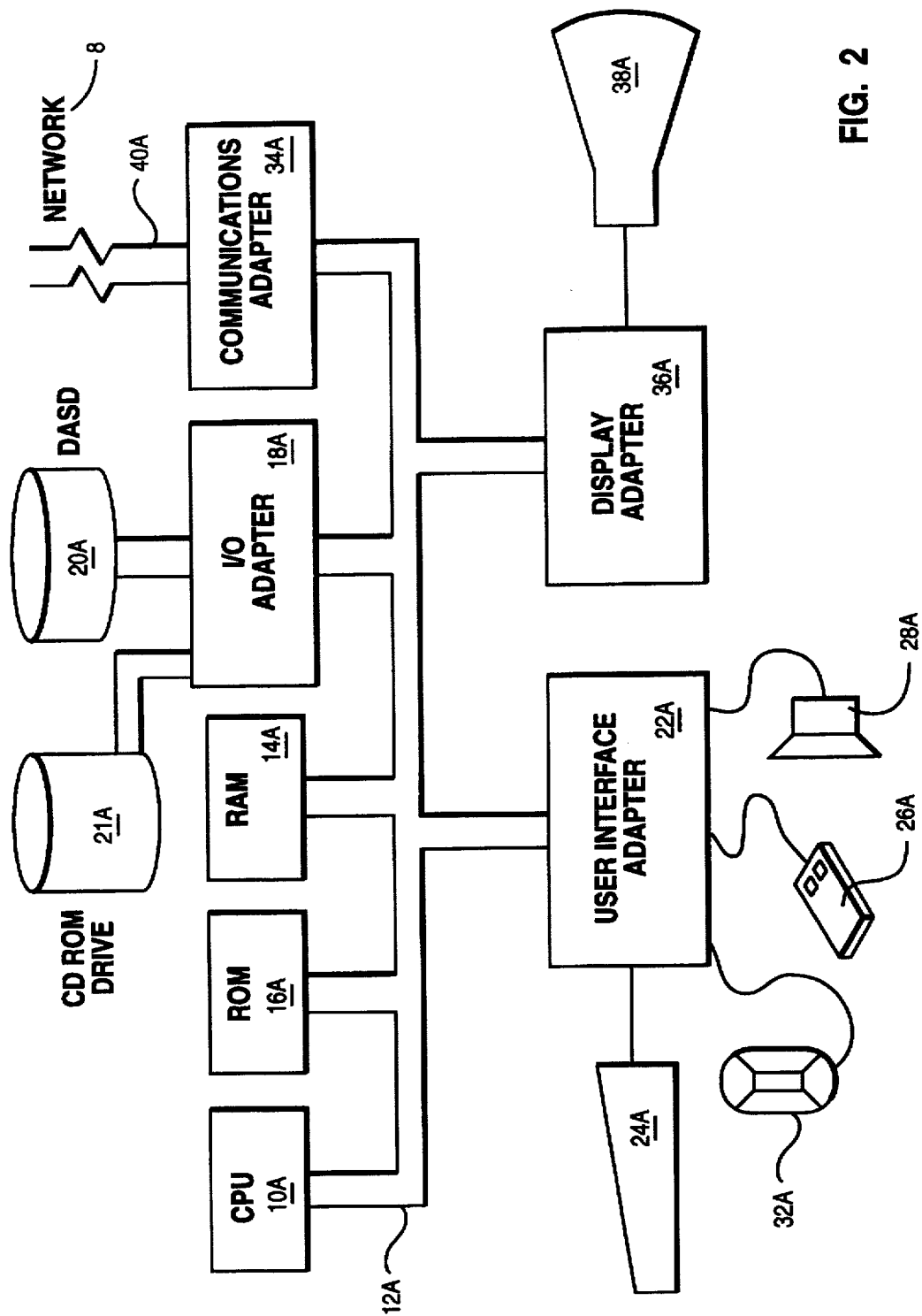
FIG. 2 is a more detailed block diagram of a representative one of the computer systems in the network of FIG. 1.

Referring now to FIG. 2, a more detailed representation of one of the computers such as computer 12 of the system 8 of FIG. 1 is depicted in which the system and method enabling adapters is implemented in accordance with the invention.

The system comprises a CPU 10A, read only memory (ROM) 16A, random access memory (RAM) 14A, I/O adapter 18A, user interface adapter 22A, communications adapter 34A, and display adapter 36A, all interconnected via a common address/data/and control path or bus 12A. Each of the above components accesses the common bus utilizing conventional techniques known to those of ordinary skill in the art, and includes such methods as dedicating particular address ranges to each component in the system, with the CPU being the busmaster. Other conventional techniques known to those of ordinary skill in the art employed in the system of FIG. 2 include direct memory access (DMA) used to transfer data at high speed from external devices such as DASD 20A or the network or the network shown to the data processing systems's RAM 14A. As is further shown in FIG. 2, these external devices such as DASD 20A and CD ROM drive 21A interface to a common bus 12A through respective adapters such as I/O adapter 18A. Other external devices, such as the display 38A similarly use their respective adapter such as display adapter 36A to provide data flow between the bus 12A and the display 38A or other device. Various user interface means are provided for interconnection and use with the user interface adapter 22A which, in the figure, has attached thereto representative user input devices such as a joy stick 32A, mouse 26A, keyboard 24A, and speaker 28A. Each of these units is well known as such and accordingly will not be described in detail herein.

The invention admits to implementation on essentially any computer system such as the RS/6000 (TM), workstations and personal computers of the IBM Corporation executing the AIX (TM), OS/2 (TM), DOS or other appropriate operating system(s) either alone or together, or similar machines of other vendors either standalone or in networks and executing one or more operating systems.

Each such computer will have, in accordance with the invention, at least two storage devices. The first (such as drive 21A) will preferably have the characteristic that it includes easily readable and removable media (such as a CD, tape, etc.) and that such media will store portions of code (such as operating system parts) which the user typically would not have a need or desire to alter or have a local copy of. Such media may, from time to time, also include yet other code which, in fact, may be desirable to download onto the client's hard drive(s) because it is pertinent essentially only to particular client(s) and not generic to operation of clients generally on the network.

The second storage device (such as DASD 20A or other form of hard drive(s), etc.) would be intended to store local, user customizable files and thus, unlike the first storage system, must be writable.

Although in a typical embodiment of the invention, a CD ROM drive, and hard drive with operating system components stored on a CD are depicted, the invention is not intended to be so limited just to operating system code being the code remaining on the first storage or even that the first storage and second storage only be limited to a CD ROM drive and hard drive, respectively. Thus, code other than operating system code may have components and aspects requiring installation of portions thereof and modification of the hard drive(s) and other components and aspects generic to multiple clients and the network which would remain solely on the CD or read-only media and not require modification of the hard drive(s). Moreover, the CD ROM drive could take the form essentially of any storage device wherein writes from the client are not normally encountered or required. Thus the reference to a "CD ROM" client is for convenience and not intended to be limiting in any way. Similarly the hard drive could be any of a number of devices permitting writes by the client.

Now that a generalized description of a computer network and individual computers comprising the network has been provided in which the invention may be advantageously employed, a more detailed explanation of conventional adapter enablement will be provided in order to more fully understand the principles of the invention which follow thereafter. After a general explanation has then been provided of the operation of the invention, this will be followed by a more detailed description thereof, with reference to FIGS. 3–5.

Figure 3:
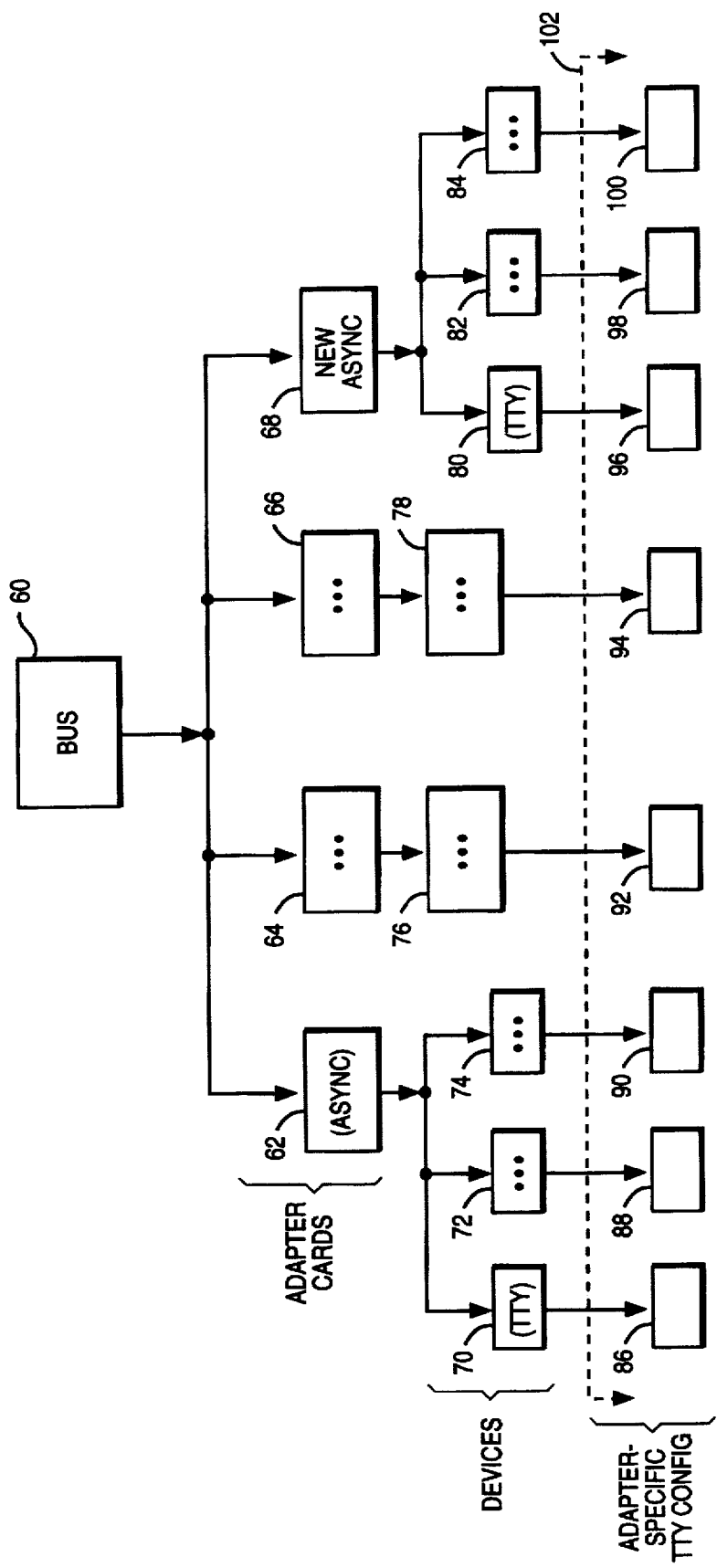
FIG. 3 is a functional block diagram illustrating the hierarchical levels of hardware and configuration code associated therewith in accordance with the invention.

Conventional computer systems have typically employed a hierarchical method for enabling components which effect essentially a vertical chain of devices as shown in FIG. 3. Thus, portions of the computer system of FIG. 2 as shown in FIG. 3 will include a bus structure 60 having attached thereto a plurality of adapter cards 62–68, each of which will in turn have one or more devices attached thereto, 70–84. It will be understood in FIG. 3 that each adapter card or device as represented therein actually represents hardware and corresponding configuration software, although in the case of the devices 70–84, this configuration software has been shown broken out as additional boxes, e.g., adapter-specific TTY configuration code 86–100.

In keeping with the conventional hierarchical enablement, the concept was that each hardware layer was essentially independent and effected an install process before progressing to install the next lower layer of hardware. More particularly, in the case of FIG. 3, for example, the bus structure 60 would be enabled, followed by the adapter cards and then the devices. Every device requires a device driver to be loaded, e.g., software that controls the device. Additionally the particular hardware must be initialized in a conventional fashion.

Typically in the enablement process, the system would start with the hardware at the top, e.g., the bus 60, and would initialize the bus and get it operating and thereafter run associated configuration software to detect the hardware devices under it, e.g., the adapter cards. Next, this layer of hardware, the adapter cards, would, in turn, include software configuration code uniquely associated with the adapter cards which when executed would initialize these adapter cards and set them up so that they may, in turn, detect the next layer of hardware devices, e.g., devices 70–84. This, in turn, would cause the installation of the devices in a similar fashion in which their configuration code also was executed to initialize the devices and set them up for operation.

As is readily apparent, this enablement was modular and dynamic in design and served the industry quite well for many years. Each layer depicted in FIG. 3 was essentially stand-alone and independent with separate code for effecting the enablement for each layer independent of the other layers. In other words, bus-related code effected configuration of and initialization of the bus; adapter card code (such as for the asynch cards shown in FIG. 3) was provided for respective adapter cards for configuring them; device specific code (such as for the TTYs 70–84) was also provided for initializing this layer of hardware.

Unfortunately, in reality as the industry developed, this preceding description wherein each layer and its corresponding configuration code was independent, turned out to increasingly not be true for certain adapters such asynchronous adapters in particular and thus the modular design did not hold up well. Specifically, for example, it was found that TTY configuration information could not necessarily be totally separated from the asynchronous hardware adapter it was connected to.

For example, as vendors provided new asynch adapters with new function TTY devices could take advantage of, the desire obviously was to change the TTY configurations to take advantage of such new asynch cards. However, as will become more apparent hereinafter, in the past, the practice was to hard code in the configuration code for the TTY devices paths for every such new asynch board which the TTY device could run on. Obviously this became unworkable because every time a vendor provided a new asynch card, the TTY vendor had to supply new code to configure the TTY device for the new asynch card. Alternatively, the system vendor, whose prior TTY code may not understand the new functionality of the new asynch board, was required to reflect these changes in the code the system vendor distributed—both solutions obviously becoming unmanageable.

Notwithstanding the foregoing, nevertheless the desire for modularity remained. The prior practice was that a manufacturer of a new asynch card distributed its corresponding asynch configuration code which essentially knew how to initialize the asynch board and set it up. This asynch card vendor typically would distribute a disk, requesting the user to copy it to the system and this is all that was required to effect installation of the new asynch card. Similarly, manufacturers of TTY devices also would distribute a disk with their device containing the TTY configuration code which again the user was requested to install and in the less complex earlier systems this was all that was required.

However, for reasons mentioned wherein it became impossible to isolate each layer's configuration code, this approach essentially was no longer workable. Nevertheless, it was still highly desirable to maintain such modularity and simplicity for the installer of new asynch or TTY cards, without the need for the card vendor to access and modify system vendor source code and without requiring system vendor itself to modify its code each time a new card became available.

To further illustrate the problems associated with the prior approach, as systems became more complex with increasing numbers and layers of hardware devices, database managers were employed to manage the data describing the various hardware components. Each such hardware device, it will be noted, is actually comprised of the hardware itself, associated configuration software which configures and sets up the hardware, and a set of data in the database which describes the hardware. In the specific embodiment herein described, this database takes the form of an Object Database Manager (ODM) which is a component of the AIX operating system although the invention is not so limited.

One example of the data maintained such a database is the name and path of the configuration software needed to configure its corresponding hardware. Other examples (for TTY hardware for example) would include the supported BAUD rates, even/odd parity the user may desire to change, and the like. Depending upon the asynch adapter the TTY hardware is to be attached to, there may of course be additional TTY characteristics unique to that asynch adapter. The installation software in accordance with the prior approach would in fact access the ODM database which was a repository of all of the characteristics of the TTY device.

However, because the database was examined with respect to only the specific TTY device (without seeking to correlate the parent adapter with which it was running) when the user/installer viewed a TTY installation screen, a screen full of TTY characteristics for the particular TTY device independent of the specific asynch adapter with which it was running and attached to was displayed, including the TTY characteristics the asynch adapter supported. The problem is that when a vendor came out with a new asynch card which had yet additional unique TTY characteristics which the computer system manufacturer desired to support, it was up to the systems manufacturer to add these characteristics to the ODM database for the TTY. Not only was this a burden on the systems manufacturer, but when these updates reflecting new asynch cards were made, nevertheless again when the user obtained a screen of TTY characteristics to change, all newly supported adapter's characteristics would appear (since they were newly added to the ODM database) regardless of whether the user actually had in fact installed that new asynch adapter in the system. Thus from a usability point of view, the user was often confused as to whether he or she was supposed to change any of those characteristics showing up on the screen.

However, yet an additional and worse problem would occur when a user would attempt to provide their own asynch card not supported by the system vendor because these additional TTY characteristics would not even show, in many instances they simply would not be added to the ODM database. The asynch card vendor or user was not in a position to alter the database inasmuch as the system vendor typically was in control of the software for reading the data from the database and initializing the hardware. Thus, the vendor was often required to purchase a source license from the system vendor in order to make the necessary database modifications to the configuration data if the systems vendor was not going to do so.

Thus, in summary, the vendor of a new asynch card obviously could have control over the configuration code and ODM database data for their particular asynchronous card and its characteristics. However, the vendor did not have any control over what the system vendor's configuration code looked at for the TTY devices. The system vendor could obviously obtain the asynch card vendor's information on what TTY characteristics the vendor's asynch card supported. However, this necessitated the systems vendor adding this data to the TTY ODM database and for the systems vendor to modify its own TTY configuration code. (It has already been noted that with respect to the latter, there are hard-coded paths for the different asynch cards to take into account minor numbers, device dependent structures or "DDS" to be described, etc.). The system vendor's TTY configuration code had to know what the rules were for generating such minor numbers and DDSs for a specific asynch adapter which the TTY device was connected to. Therefore, in accordance with prior practice, the vendor would have to tell the systems manufacturer how the asynch vendor's device driver worked, how the vendor assigned minor numbers, and to request the systems vendor to put the appropriate support code in the system vendor's TTY configuration code. For reasons previously mentioned, when the number of new asynch card vendor increased, this obviously became unworkable for the systems vendor, as did the approach of having the vendor access the system vendor's source code so that the asynch vendor may perform these changes.

For all the foregoing reasons, a new approach was needed in the industry which has been provided by the subject invention. In accordance with the invention, a new set of configuration routines is defined. It will be recalled that in conventional practice each piece of hardware had configuration code associated with it that provided the instructions for configuring its corresponding hardware. However, now in accordance with the invention, a separate code module of TTY configuration code is provided which is asynch card dependent.

When the TTY configuration code executes, it essentially does a reversal from the top-down approach of the bus configuration code examining the adapter cards attached thereto, and the adapter card configuration code detecting the TTY devices attached to the asynch cards, etc. In accordance with this reversed approach, the TTY configuration code essentially will look "upwards" to the asynch card it is attached to and once it is determined what this card is, it will invoke special TTY configuration code belonging to that particular adapter. In other words, the TTY configuration code looks at what the parent asynch adapter is which is actually present and connected to the TTY device, and will then run adapter-specific TTY configuration code. This TTY configuration code will also examine the parent adapter's ODM data.

It will be recalled in the past that ODM data for a TTY device would be included in the ODM database associated with that particular TTY device. This TTY's ODM data would be in the ODM database strictly associated with that particular asynch card. However, now a TTY's device characteristics appearing on a configuration screen may be associated not only with the device but also with the parent device. Therefore, now the characteristics appearing on the configuration screen are determined not only by the TTY device selected but also the asynch device to which it is connected.

It should be noted in passing that although in the embodiment herein described reference is made to asynch cards and their respective TTY devices, the invention is not intended to be so limited. Rather, it applies equally as well and may be implemented generically for essentially any two layers or classes of devices wherein the characteristics of the "lower level" (such as a TTY device) depend upon the adapter (such as an asynch adapter) to which it is connected.

Just as the invention is not intended to be limited to asynch devices, neither is it intended to be limited to particular devices attached thereto. In the embodiment under consideration, these devices have been referred to as "TTY" devices or more generically as asynchronous communication devices which may take the form of a modem, asynchronous display, serial printer, or the like. However, as aforementioned, these could be any devices which operate with higher level devices which in turn contain information about the lower level device. It just happens that in the embodiment being described, these higher level devices, e.g., adapter cards, are a convenient way to describe this application inasmuch as they typically contain information about the lower level TTY device configurations.

It will be noted that ODM data associated with particular asynchronous cards will still remain. However, it will be appreciated that what has been provided is a mechanism to add additional characteristics into the ODM database, e.g., a flag which indicates that there are characteristics which apply to a specific child TTY device when attached to a specific asynch card rather than another asynch card. An asynch card vendor may thereby be enabled to add a new asynch card intended for use in the system without even having to involve the system manufacturer in adapting the system to receive the card. The vendor would effect this by providing asynch adapter-specific TTY configuration modules to be hereinafter described. In accordance with the prior practice, each asynch card could operate with multiple TTY hardware devices, each with its own TTY configuration code. As noted, however, each TTY device could alternatively be connected to any one of multiple possible asynch cards. For each type of asynch card, obviously different TTY configuration code is required. In accordance with prior practice, in the configuration of the TTY layer, only TTY configuration code corresponding to the particular asynch adapter to which it was connected would be executed.

The vendor's configuration code provides the functionality of loading the device drivers associated with that vendor's card. The asynch card vendors will continue to generate their own ODM data for their asynch card describing its characteristics, and will further provide software which knows how to receive the appropriate information from the ODM database, load their driver, pass this information to their device driver, and then invoke the system manufacturer's TTY configuration code. It will be noted that in accordance with the system, the system vendor's TTY configuration code, having defined interfaces appropriately, may examine the vendor's ODM data to obtain the name and path of the asynch adapter-specific TTY configuration software of the vendor. As long as the vendor places into their ODM data such correct name and path of the vendor-supplied adapter-specific TTY configuration code, then the system vendors configuration code can locate it.

This vendor-supplied adapter-specific TTY configuration code will of course relate to the asynch device's characteristics associated with the TTY because the vendor may have added additional TTY characteristics associated with their new asynch card(s). The systems vendor has simply defined the interfaces in order to instruct the asynch card vendor how to put such unique TTY characteristics associated with their asynch card into the ODM data for such a synch card. The system vendor's configuration code modules thus may pick up all of the characteristics which the system vendor has provided into the ODM database for the TTY devices the system vendor supports.

Additionally, such system vendor's configuration code will thereby pick up the TTY characteristics which the asynch card vendor has placed into his or her ODM data for such vendor's asynch card. The system of the invention automatically draws these two collections of TTY attributes or characteristics together (those which are system vendor-supported and those which are asynch card vendor provided) to build up a total set of characteristics for a particular TTY device.

If the asynch card vendor has utilized the system vendor's interfaces correctly, the system vendor's configuration code will locate the vendor's TTY characteristics. When the adapter-specific TTY characteristics configuration software is invoked, the user will thereby be provided with a list of all the TTY characteristics pulled out of the ODM database which will include those for the system vendor's set of supported TTYs and asynch cards as well as those for the asynch card vendors who have provided them independently of the system vendor. It still remains for the asynch card vendor's configuration code to understand the characteristics from the list but the point is that the system vendor no longer is required to understand the characteristics and attributes of the asynch vendor's cards and TTY characteristics supported individually, but rather merely how to extract them from the ODM database and pass them to the vendor's TTY configuration code.

Figure 4:
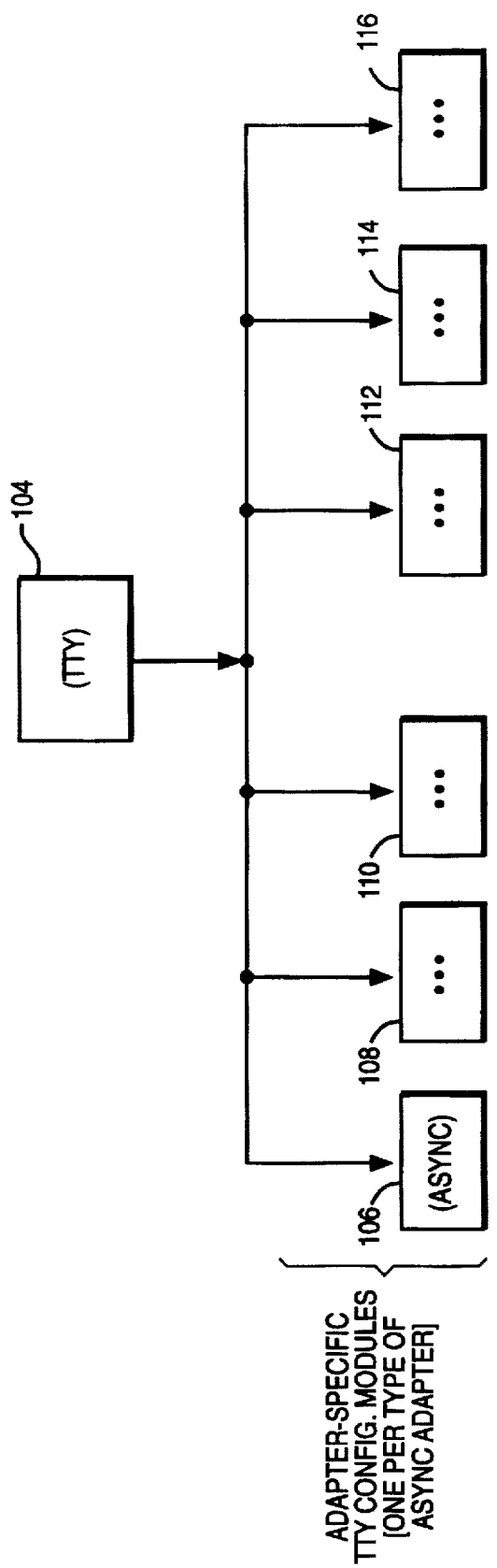
FIG. 4 is a functional block diagram illustrating the reverse procedure of the invention in which TTY configuration code examines and executes multiple adapter-specific TTY configuration modules.

Now that a general explanation has been provided of the invention, more detailed aspects thereof will be hereinafter described with reference to FIGS. 3–5.

First, with respect to FIG. 3, it will be recalled that each box is actually intended to represent not only the layer's hardware but the associated configuration software modules, except for the case of the TTY devices wherein at least the adapter-specific TTY configuration software is shown separately as boxes 86–100 below line 102. In accordance with the invention, the vendor will supply the following configuration software:

asynch adapter card configuration software
asynch adapter-specific TTY configuration software
asynch adapter-specific ODM database data
asynch adapter-specific TTY characteristics in their respective adapter-specific ODM data.

In the past, in configuring a TTY such as TTY 72 of FIG. 3, because the configuration system made no attempt to associate TTY characteristics with the specific asynch adapter card (62) it was attached to as a child, when the screen appeared to the user, it was full of TTY characteristics independent of the TTY characteristics associated with the particular asynch card 62. Thus when a new asynch card 68 was provided, reflecting to a user these new TTY attributes associated with the new asynch card 68 was difficult, either requiring the system provider to have detailed knowledge of the new asynch card and alter code accordingly, or to require the asynch card vendor to alter the system vendor's code.

There was no attempt to have the adapter-specific TTY configuration code run to detect the particular asynch card to which it is attached and once having done so, invoking special TTY configuration code associated with that particular asynch adapter. This "reverse" approach is shown in FIG. 4. For a given TTY device 104, when TTY configuration code therefor is executed it causes one of multiple adapter-specific TTY configuration modules (1 per type of asynch adapter) shown at reference numerals 106–116 to execute.

Several more detailed descriptions of various aspects of the invention will now be made. First, reference has been made to each asynch adapter requiring adapter-specific functions such as those effecting the building of each adapter's unique device dependent structure (DDS). More explanation regarding these DDS structures will now be provided. If two different adapters with differing device drivers (for example an asynchronous card and a newer asynchronous card) are available, it will be appreciated that each will typically have totally different configuration code. The DDS contains the information necessary to pass to the device driver associated with the adapter hardware in order to instruct the driver how to initialize the adapter. Such information passed to the driver is dependent upon what the particular asynch adapter driver is connected to and relates to the ODM data as far as the new TTY support characteristics are concerned, which must be put into the ODM database for their respective asynch adapters. The system vendor's configuration code must understand these TTY characteristics, obtain them, and place them in such a DDS data structure which is passed to the asynch's device driver.

Typically in the past, the asynch vendor requested the system vendor to alter the system's code in order to do so. Nevertheless, it is left up to the asynch card vendor to define such DDS structures. The structures per se, will be unique for each device driver and associated hardware. Similarly, even if a single device driver is considered for two asynchronous cards both employing the same device driver, even though the structures may be identical (since the same type adapter cards are being considered), the actual data per se within the structures will obviously differ. These data structures may be seen to essentially be the data structures that the TTY configuration code fills in and passes to the respective device drivers. Each device may be seen to include essentially two pieces of code—first the device driver itself which communicates with the operating system kernel, and the associated configuration code which extracts ODM data and builds the respective DDS structure in order to pass this ODM data to the device driver.

Another specific function previously referred to and required by each asynchronous adapter is the one which generates "minor numbers". This may be recognized as a UNIX term referring to the manner in which differing instances of devices are kept track of. For example, if three TTY devices 86, 88, 90 of FIG. 3 are referenced, each typically may have a unique minor number utilized by software in order to communicate with it which is device-dependent upon the particular device the minor number is associated with.

Yet another aspect of the invention previously mentioned is the issuance of an "LSATTR" command associated with a TTY on the native serial port. This is typically a command employed to list characteristics of a device offered by an operating system. It is contemplated that such a command will be modified so as to understand how to pick up characteristics of its corresponding device from its ODM data and further how to determine whether its parent to which it is connected contains additional characteristics belonging to the child hardware which in accordance with the invention have now been added by the vendor into the ODM (as opposed to the system vendor being required to do so).

Reference has been made to "load modules" hereinbefore as well, which are shown in FIG. 3, depicted between the dotted line 102 and essentially comprise adapter specific TTY configuration code. Configuration software for the layers above the dotted line are typically separate UNIX commands which get invoked and run the various configuration software. Execution of these commands will effect loading of the aforementioned load modules. In other words, the system vendor's TTY configuration command loads and links the load modules below line 102 dynamically to the system vendor's configuration code (CFGTTY in the embodiment disclosed) at run time.

Reference has further been made to such load module attributes being stored in given adapters' "PDAT" information. Such PDAT information may be recognized as the vendor-supplied second level ODM components which relate to their adapter cards and contain the path and name of the various load modules 86–100.

Figure 5:
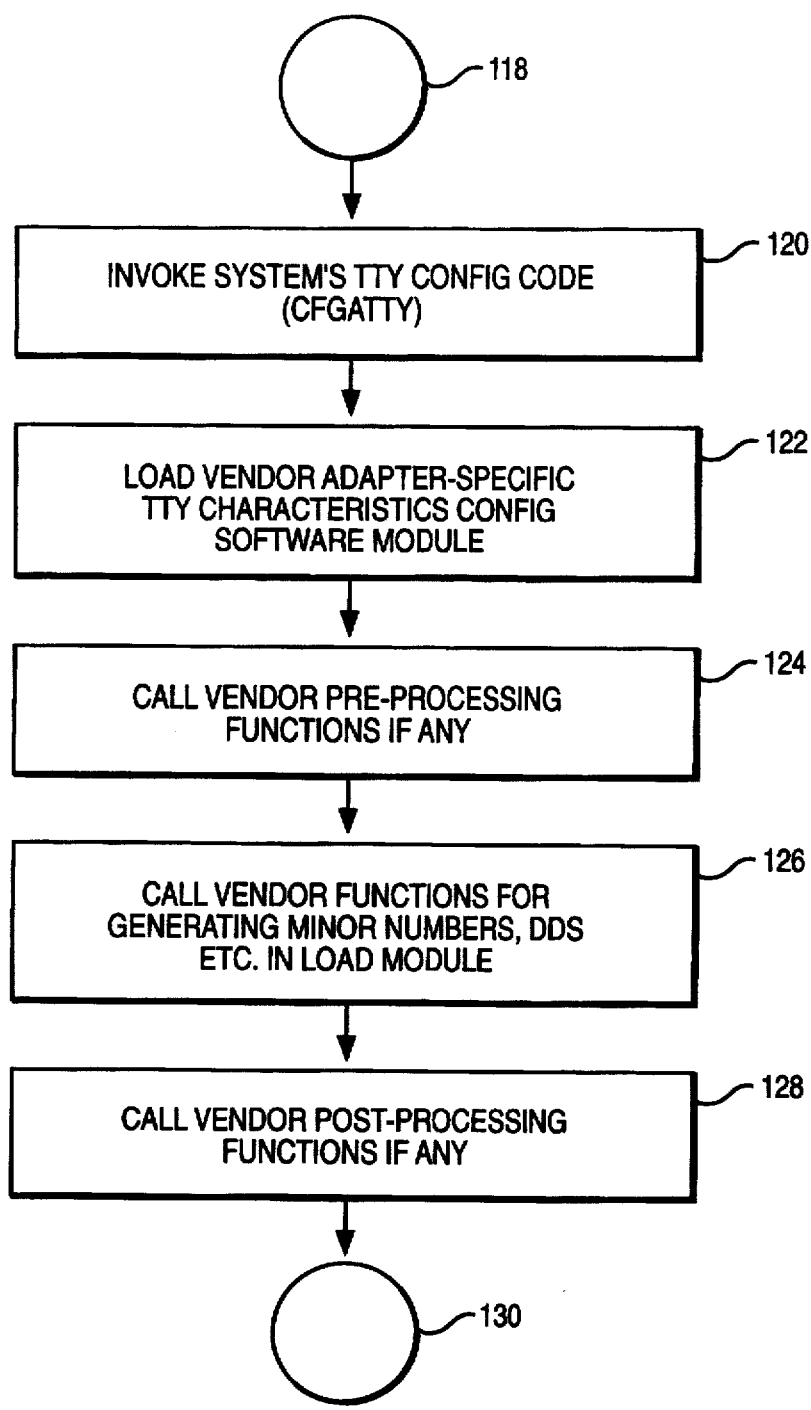
FIG. 5 is a flow diagram illustrating the operation of asynch adapter enablement functionality in conjunction with the systems of FIGS. 1–4.

Referring now to FIG. 5, in a preferred embodiment of the invention, the system vendor configuration code permits the asynch card vendor to optionally execute at least two functions which the system vendor's code will call. Specifically, by this design, the asynch card vendor will be permitted to perform preprocessing as desired before calling the vendor's functions for generating the aforementioned minor numbers in building the DDS structures. Similarly, the asynch card vendor will preferably be provided with an opportunity for post-processing to be hereinafter described.

With reference to FIG. 5, the new adapter enablement scheme will be effected by implementing code following the flow diagram of FIG. 5 in the systems of FIGS. 1–4. The process will be entered at 118, whereupon the system vendor's TTY configuration code (CFGATTY) 120 will be invoked. This, in turn, will effect loading of the asynch vendor's adapter-specific "load modules" or adapter-specific TTY characteristics configuration software modules 122.

Next, as described, if any pre-processing functions are desired by the vendor, the flow diagram permits these at 124 in case there are additional functions which the vendor is in need of having performed. Next, the system will call the asynch card vendor's functions for generating minor numbers, building the DDS structures, etc., such functions having been put in the load module by the asynch card vendor. This step is shown at block 126 in FIG. 5.

Finally, asynch card vendor post-processing functions may be called as desired, 128, in the event the vendor desires to perform additional processing related to their device driver or hardware generally. These pre- and post-processing steps are provided to reduce the risk of the system vendor's routines not handling certain events.

If the asynch card vendor has utilized the system vendor's interfaces correctly, the system vendor's configuration code will locate the vendor's TTY characteristics. When the adapter-specific TTY characteristics configuration software is invoked, the user will thereby be provided with a list of all the TTY characteristics pulled out of the ODM database which will include those for the system vendor's set of supported TTYs and asynch cards as well as those for the asynch card vendors who have provided them independently of the system vendor. It still remains for the asynch card vendor's configuration code to understand the characteristics from the list but the point is that the system vendor no longer is required to understand the characteristics and attributes of the asynch vendor's cards and TTY characteristics supported individually, but rather merely how to extract them from the ODM database and pass them to the vendor's TTY configuration code.

Now that a general explanation has been provided of the invention, more detailed aspects thereof will be hereinafter described with reference to FIGS. 3–5.

In the past, in configuring a TTY such as TTY 72 of FIG. 3, because the configuration system made no attempt to associate TTY characteristics with the specific asynch adapter card (62) it was attached to as a child, when the screen appeared to the user, it was full of TTY characteristics independent of the TTY characteristics associated with the particular asynch card 62. Thus when a new asynch card 68 was provided, reflecting to a user these new TTY attributes associated with the new asynch card 68 was difficult, either requiring the system provider to have detailed knowledge of the new asynch card and change and alter code accordingly, or to require the asynch card vendor to alter the system vendor's code. There was no attempt to have the adapter-specific TTY configuration code run to detect the particular asynch card to which it is attached and once having done so, invoking special TTY configuration code associated with that particular asynch adapter. This "reverse" approach is shown at FIG. 4. For a given TTY device 104, when TTY configuration code therefor is executed, it causes one of multiple adapter-specific TTY configuration modules (one per type of asynch adapter) shown at reference numerals 106–116 to execute.

Several more detailed descriptions of various aspects of the invention will now be made. First, reference has been made to each asynch adapter requiring adapter-specific functions such as those effecting the building of each adapter's unique device dependent structure (DDS). For explanation regarding these DDS structures will now be provided.

If two different adapters with differing device drivers (for example an asynchronous card and a newer asynchronous card) are available, it will be appreciated that each will typically have totally different configuration code. The DDS contains the information necessary to pass to the device driver associated with the adapter hardware in order to instruct the driver how to initialize the adapter. Such information passed to the driver is dependent upon what the particular asynch adapter driver is connected to and relates to the ODM data as far as the new TTY support characteristics are concerned which must be put into the ODM database for their respective asynch adapters. The system vendor's configuration code must understand these TTY characteristics, obtain them, and place them in such a DDS data structure which is passed to the asynch's device driver. Typically in the past, the asynch vendor has requested the system vendor to alter the system's code in order to do so. Nevertheless, it is left up to the asynch card vendor to define such DDS structures. The structures per se will be unique for each device driver and associated hardware.

Similarly, even if a single device driver is considered for two asynchronous cards both employing the same device driver, even though the structures may be identical since the same type adapter cards are being considered, the actual data per se within the structures will obviously differ. These data structures may be seen to essentially be the data structures that the TTY configuration code fills in and passes to the respective device drivers. Each device may be seen to include essentially two pieces of code—first the device driver itself which communicates with the operating system kernel, and the associated configuration code which extracts ODM data and builds the respective DDS structure in order to pass this ODM data to the device driver.

Another specific function previously referred to and required by each asynchronous adapter is the one which generates "minor numbers". This may be recognized as a UNIX term referring to the manner in which differing instances of devices are kept track of. For example, if three TTY devices 86, 88, 90 of FIG. 3 are referenced, each typically may have a unique minor number utilized by software in order to communicate with it which is device-dependent upon the particular device the minor number is associated with.

Yet another aspect of the invention previously mentioned is the issuance of an "LSATTR" command associated with a TTY on the native serial port. This is typically a command employed to list characteristics of a device offered by an operating system. It is contemplated that such a command will be modified so as to understand how to pick up characteristics of its corresponding device from its ODM data and further, how to determine whether its parent to which it is connected contains additional characteristics belonging to the child hardware which in accordance with the invention have now been added by the vendor into the ODM (as opposed to the system vendor being required to do so).

Reference has been made to "load modules" hereinbefore as well, which are shown in FIG. 3 depicted beneath the dotted line 102 and essentially comprise adapter-specific TTY configuration code. Configuration software for the layers above the dotted line are typically separate UNIX commands which get invoked and run the various configuration software. Execution of these commands will effect loading of the aforementioned load modules. In other words, the system vendor's TTY configuration command loads and links the load modules below line 102 dynamically to the system vendor's configuration code (CFGTTY in the embodiment disclosed) at run time.

Reference has further been made to such load module attributes being stored in given adapters' "PDAT" information. Such PDAT information may be recognized as the vendor-supplied second level ODM components which relate to their adapter cards and contain the path and name of the various load modules 86–100.

Referring now to FIG. 5, in a preferred embodiment of the invention, the system vendor configuration code permits the asynch card vendor to optionally execute at least two functions which the system vendor's code will call. Specifically, by this design, the asynch card vendor will be permitted to perform preprocessing as desired before calling the vendor's functions for generating the aforementioned minor numbers and building the DDS structures. Similarly, the asynch card vendor will preferably be provided with an opportunity for post-processing to be hereinafter described.

With reference to FIG. 5, the new adapter enablement scheme will be effected by implementing code following the flow diagram of FIG. 5 in the systems of FIGS. 1–4. The process will be entered at 118, whereupon the system vendor's TTY configuration code (CFGATTY) 120 will be invoked. This, in turn, will effect loading of the asynch vendor's adapter-specific "load modules" or adapter-specific TTY characteristics configuration software modules 122.

Next, as described, if any pre-processing functions are desired by the vendor, the flow diagram permits these at 124 in case there are additional functions which the vendor is in need of having performed. Next, the system will call the asynch card vendor's functions for generating minor numbers, building the DDS structures, etc., such functions having been put in the load modules by the asynch card vendor. This step is shown at block 126 in FIG. 5. Finally, the routine of FIG. 5 exits at 130.

Yet an additional feature of the system vendor's TTY configuration code may be implemented if desired to permit the asynch card vendor to essentially replace the system vendors configuration code substantially if desired. The aforementioned load module steps obviously permit the asynch card vendor to do a more minimal amount of work in the configuration project, e.g., providing the code necessary for generating minor numbers, building DDSs, and perhaps pre- and or post-processing. However, the invention further contemplates providing an exit in the system vendor's CFGTTY configuration module so as to enable the asynch card vendor to essentially replace the system vendor's TTY configuration code substantially in its entirety with that provided by the asynch card vendor. In accordance with this feature, the system vendor's configuration code is invoked and recognizes by the exit that the asynch card vendor has provided its own TTY configuration code rather than merely the load modules. Without this feature, before the invention in conventional operation would simply load these load modules and then call the associated functions for generating minor numbers and DDS structures. However, with this additional feature, it is the asynch card vendor's TTY configuration code which would be invoked from within the system vendor's TTY configuration code, and thereafter the asynch card vendor's configuration code would handle in its entirety the functions shown in FIG. 4.

In summary, there are two significant aspects to operation of the invention. First, the previously described mechanism whereby the system vendor's code effects the loading of the asynch card vendor-supplied load modules. Secondly, the other important aspect of the invention relates to how the various TTY characteristics are stored with their associated adapter's SODM information. Routines previously referenced such as LSATTR, GETATTR, PUTATTR, CFGTTY, CHGTTY, may be recognized in the UNIX environment as methods for getting and modifying characteristics of a device. In accordance with the invention such commands have been modified so that now when it is desired to obtain or modify a characteristic of a device, the system knows how to locate and deal with these characteristics without concern over whether the characteristics are in the ODM for the child or the parent device. It will be noted that heretofore, it was necessary to have to store all of an asynch device's characteristics in the ODM and to associate them with one TTY device. However, with the advent of the subject invention, it is now possible to do this or, in the alternative, to store such characteristics in the ODM under the parent device.

It will be appreciated that because of the existence of prior systems, some ODM characteristic database information may not have been modularized in accordance with the invention so as to permit the asynch card vendor to easily provide this information, e.g., it may have been committed to the database by the system vendor modifying its source code in accordance with conventional practices.

However, the invention has further contemplated an additional type attribute herein for convenience referred to as an "E" type. This new type will permit TTY characteristics or attributes of devices to reside in either place, e.g., stored with all of an asynch devices characteristics in the ODM in aggregate as in the conventional older practice or, in the alternative, stored in the ODM under parent devices. The invention contemplates putting the set of these two characteristics together, wherein the "E" type essentially serves as a flag which, when present, indicates that the asynch card vendor is employing the concepts of the invention for storing characteristics in the ODM under the parent device. In the absence of such flag, this indicates that the system vendor per se has simply placed the TTY characteristics in the ODM as asynchronous adapter-specific ODM data. The "E" type, e.g., extended attributes, thus places the TTY device characteristics in the ODM under the device's ODM information such that these additional characteristics are parent dependent. Thus, in summary, it will be seen a mechanism is provided for handling TTY characteristics for TTY devices which are dependent upon the parent asynch card. Thus a scheme is thereby provided to get them into the ODM database and to describe code necessary to understand these two differing places which the system must examine in order to retrieve the characteristics.

While the invention has been shown and described with reference to particular embodiments thereof, it will be understood by those skilled in the art that the foregoing and other changes in form and detail may be made therein without departing from the spirit and scope of the invention.

We claim:

1. For use in a computer system including a database, at least one first-level device, at least one second-level device, and second-level device configuration program code, a method for enabling said at least one first-level device in said system, comprising:

generating a load module including
    functions relating to attributes of said at least one second-level device specific to said at least one first-level device, said functions including
        generating a minor number for each said at least one second-level device; and
        generating a device-dependent data structure for each said at least one first-level device; and
    a load module stored in said database wherein said database is an object database manager; and linking said load module to said program code at runtime; said linking comprising:
    accessing said load module attribute from said object database manager; and
    locating said load module in response to said accessing;

wherein said load module attribute is a second level component of said object database manager and includes a oath and name for said load module;

wherein said at least one first level device is an asynchronous adapter; and said at least one second-level device is a tty device;

wherein said method further includes executing said functions to generate said minor number and said device dependent data; and wherein said program code includes
    system configuration program code; and
    vendor configuration program code; and wherein said method further includes
    providing an exit from said system configuration program code;
    invoking said system configuration program code;
    detecting said exit; and
    executing said vendor configuration program code in response to said detecting.

2. The method of claim 1 wherein said system includes at least one pre-installed first level device; and wherein said method further includes the step of executing a pre-processing or post-processing function not present in said at least one pre-installed first level device.

3. The method of claim 2 further including defining an extended type attribute for predefined attributes stored in said database; and storing, in response to said defining, attributes for said at least one second-level device specific to said at least one first-level device under a unique type identifier for said at least one first-level device.

4. The method of claim 3, further including querying said at least one first-level device for presence of said extended type attribute.

5. For use in a computer system including a database, at least one first-level device, at least one second-level device, and second-level device configuration program code, apparatus for enabling said at least one first-level device in said system, comprising:

means for generating a load module including
functions relating to attributes of said at least one second-level device specific to said at least one first-level device, said functions including
generating a minor number for each said at least one second-level device; and
generating a device-dependent data structure for each said at least one first level device; and
a load module attribute stored in said database;

means for linking said load module to said program code at runtime wherein said means for linking includes
means for accessing said load module attribute from said object database manager; and
means for locating said load module in response to said accessing;

wherein said load module attribute is a second level component of said object database manager; and includes a path name for said load module;

wherein said at least one first level device is an asynchronous adapter; and said at least one second-level device is a tty device;

wherein said apparatus further includes means for executing said functions to generate said minor number and said device dependent data;

wherein said program code includes
system configuration program code; and
vendor configuration program code; and wherein said apparatus further includes
means for providing an exit from said system configuration program code;
means for invoking said system configuration program code;
means for detecting said exit; and
means for executing said vendor configuration program code in response to said detecting.

6. The apparatus of claim 5 wherein said system includes at least one pre-installed first level device; and wherein said apparatus further includes means for executing a pre-processing or post-processing function not present in said at least one pre-installed first level device.

7. The apparatus of claim 6 further including means for defining an extended type attribute for predefined attributes stored in said database; and means for storing, in response to said defining, attributes for said at least one second-level device specific to said at least one first-level device under a unique type identifier for said at least one first-level device.

8. The apparatus of claim 7, further including means for querying said at least one first-level device for presence of said extended type attribute.

* * * * *

UNITED STATES PATENT AND TRADEMARK OFFICE
CERTIFICATE OF CORRECTION

PATENT NO. : 5,802,362
DATED : Sept. 1, 1998
INVENTOR(S) : Lipp et al

It is certified that error appears in the above-identified patent and that said Letters Patent is hereby corrected as shown below:

Column 16, line 48: change "oath" to --path--.

Signed and Sealed this

Twelfth Day of January, 1999

Attest:

Attesting Officer

*Acting Commissioner of Patents and Trademarks*